(12) United States Patent
Wienand et al.

(10) Patent No.: US 8,064,069 B2
(45) Date of Patent: Nov. 22, 2011

(54) METHOD AND SYSTEM FOR MEASURING THE SHAPE OF A REFLECTIVE SURFACE

(75) Inventors: Stephan Wienand, Zwingenberg (DE); Armin Rudert, Essen (DE)

(73) Assignee: ISRA Surface Vision GmbH, Herten (DE)

(*) Notice: Subject to any disclaimer, the term of this patent is extended or adjusted under 35 U.S.C. 154(b) by 482 days.

(21) Appl. No.: 12/295,470

(22) PCT Filed: Mar. 8, 2007

(86) PCT No.: PCT/EP2007/001999
§ 371 (c)(1),
(2), (4) Date: Apr. 6, 2009

(87) PCT Pub. No.: WO2007/115621
PCT Pub. Date: Oct. 18, 2007

(65) Prior Publication Data
US 2010/0060905 A1    Mar. 11, 2010

(30) Foreign Application Priority Data
Apr. 5, 2006  (DE) .......................... 10 2006 015 792

(51) Int. Cl.
*G01B 11/30* (2006.01)
(52) U.S. Cl. ................... 356/612; 356/601; 356/610
(58) Field of Classification Search ........... 356/600–640
See application file for complete search history.

(56) References Cited

U.S. PATENT DOCUMENTS

| | | | | |
|---|---|---|---|---|
| 3,137,362 A * | 6/1964 | Green ........................ | 181/198 |
| 3,799,679 A * | 3/1974 | Simko ........................ | 356/431 |
| 4,294,544 A * | 10/1981 | Altschuler et al. ............ | 356/610 |
| 4,508,452 A * | 4/1985 | DiMatteo et al. ............. | 356/610 |
| 4,876,455 A * | 10/1989 | Sanderson et al. ....... | 250/559.22 |
| 5,003,615 A * | 3/1991 | Seitz ........................... | 382/108 |

(Continued)

FOREIGN PATENT DOCUMENTS
DE    196 43 018    4/1998
(Continued)

OTHER PUBLICATIONS

Marcus Petz et al: "Reflection Grating Photogrametry . . . " Optical Manufacturing and Testing VI, Proc. of SPIE vol. 5869, 2005 (In Eng.).

(Continued)

*Primary Examiner* — Tarifur Chowdhury
*Assistant Examiner* — Jarreas C Underwood
(74) *Attorney, Agent, or Firm* — Micahel J. Striker

(57) ABSTRACT

The invention describes a method for measuring the shape of a reflective surface (14) and a corresponding system which has at least one pattern (15) for reflection at the reflective surface (14) and at least one camera (1) for viewing the pattern (15) which is reflected at the surface (14) pixel by pixel, wherein the position and orientation of the camera (1) and of the pattern (15) are known. In order to reliably measure the shape of reflective surfaces with a small amount of equipment complexity, the viewing directions of the camera (1), which are known for the pixels (8), and the positions of the pattern (15), which correspond to the mapping of the reflected pattern (15) to pixels (8) of the camera (1), are used to determine the surface angle and surface height for the purpose of measuring the shape.

23 Claims, 4 Drawing Sheets

U.S. PATENT DOCUMENTS

| | | | |
|---|---|---|---|
| 5,075,560 A * | 12/1991 | Greivenkamp et al. | 250/559.16 |
| 6,166,808 A * | 12/2000 | Greve | 356/601 |
| 6,392,754 B1 * | 5/2002 | Pingel et al. | 356/603 |
| 7,394,536 B2 | 7/2008 | Sonda et al. | |
| 2004/0174540 A1 * | 9/2004 | Saito | 356/612 |
| 2006/0050284 A1 | 3/2006 | Bertin-Mourot et al. | |

FOREIGN PATENT DOCUMENTS

| | | |
|---|---|---|
| DE | 197 57 106 | 6/1999 |
| DE | 101 27 304 | 12/2002 |
| DE | 103 45 586 | 5/2005 |
| WO | 02/42715 | 5/2002 |
| WO | 2004/013572 | 2/2004 |
| WO | 2005/119172 | 12/2005 |

OTHER PUBLICATIONS

Soeren Kammel: "Deflectometry for Quality Control of Specular Surfaces" Technisches Messen 70, 2003 (With Eng. Abst.).

Franz Mesch: "Automatische Inspektion . . . " Technisches Messen 64, 1997 (With Eng. Abst.).

* cited by examiner

Fig. 3
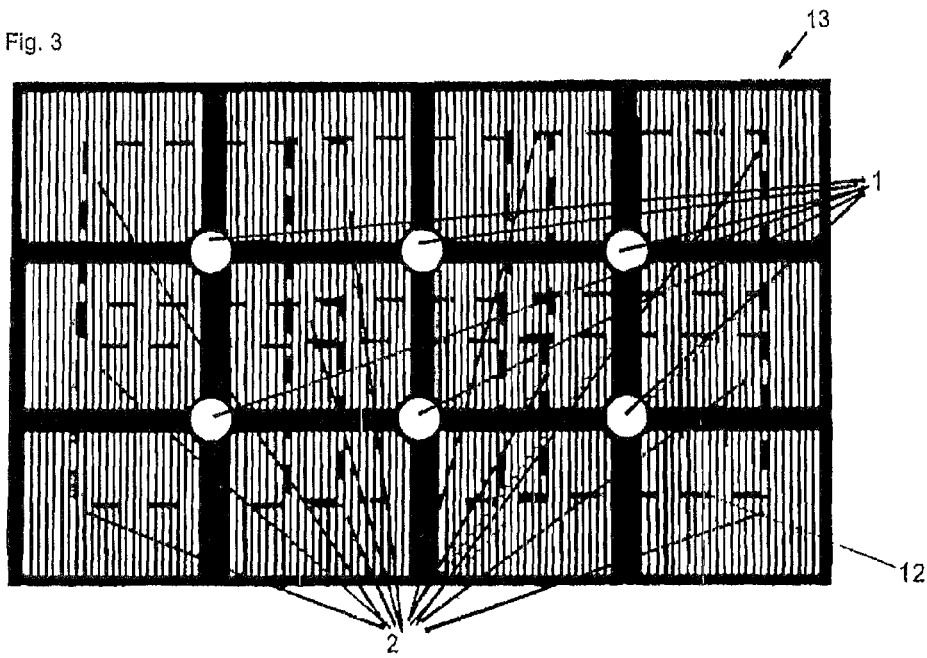
Fig. 4
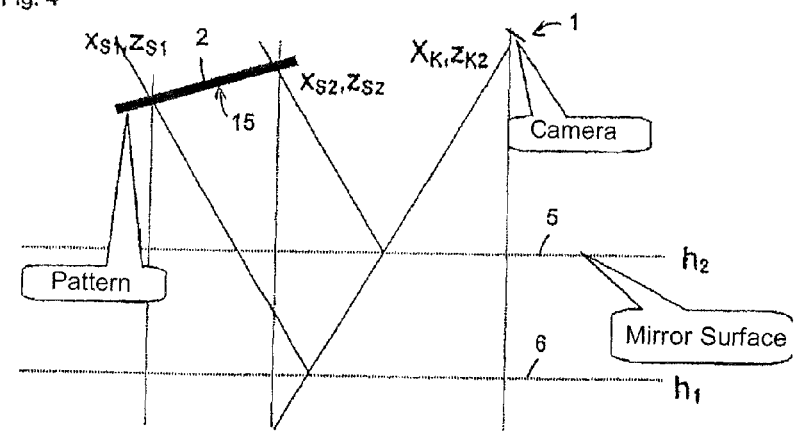
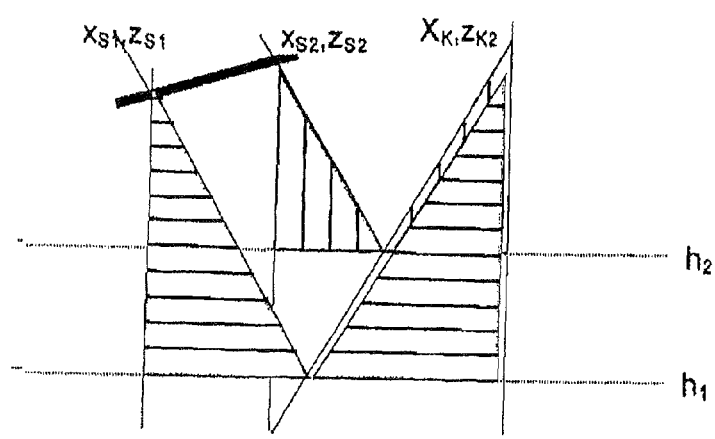

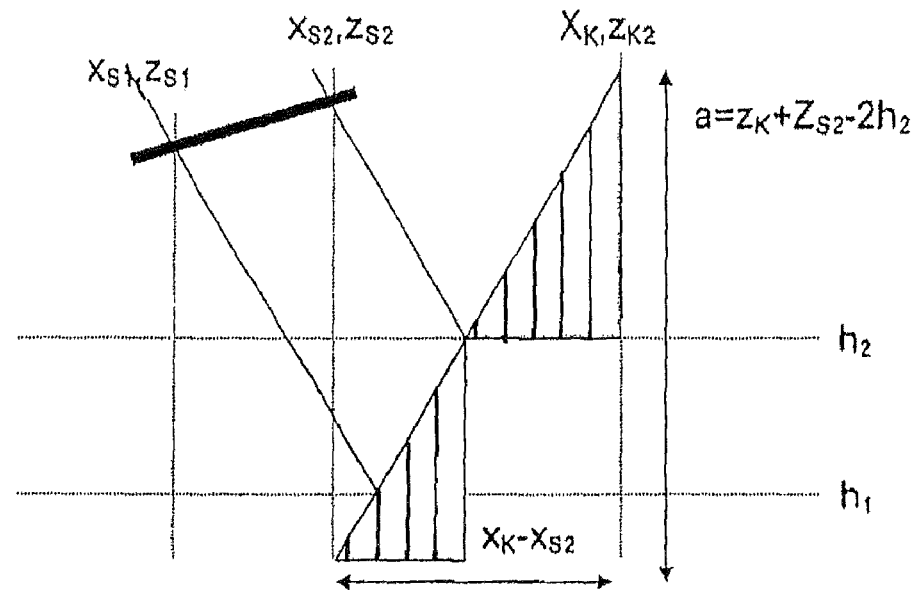
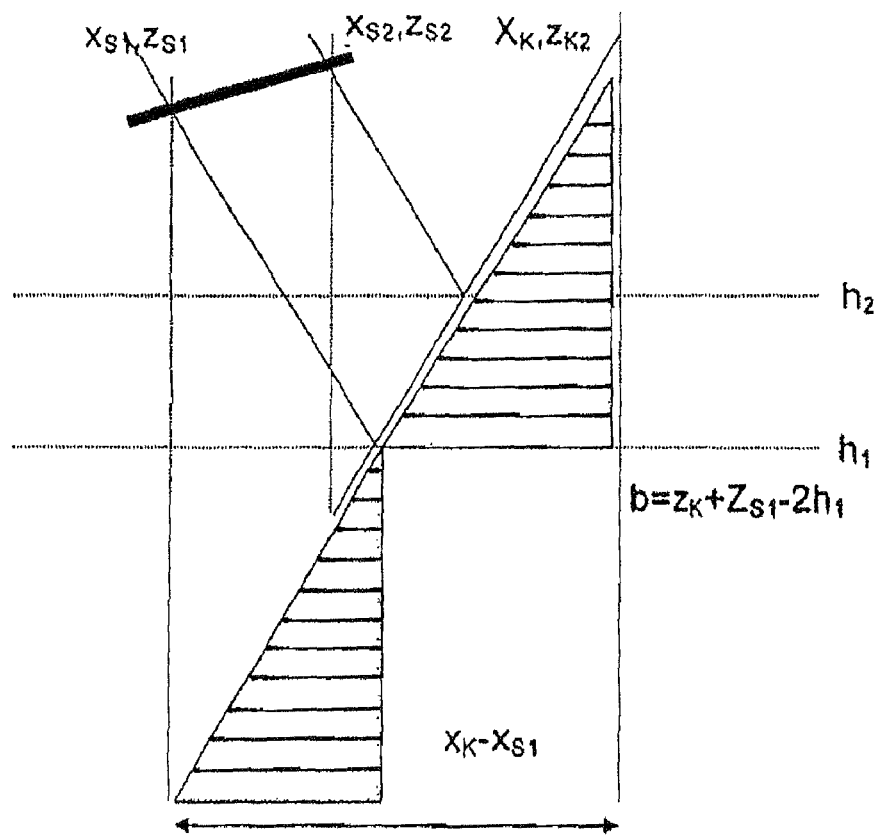

METHOD AND SYSTEM FOR MEASURING THE SHAPE OF A REFLECTIVE SURFACE

The invention relates to a method and a system for measuring the shape of a reflective surface for which at least one pattern for reflection at the reflective surface and at least one camera for viewing the surface pixel by pixel are provided, wherein the position and orientation of the camera and the pattern are known. Further, a method for calibration of the system is described, which in particular can be used for determination of the position and orientation of the camera and the pattern. The measuring of the shape and the calibration can also be performed within the scope of a common method.

Such methods, in which a pattern with a known shape and position is mirrored in a reflective surface, and the mirror image is viewed and evaluated by a camera, are known for measuring the shape of reflective surfaces. For example, DE 197 57 106 A1 describes a device for automatic measuring of the shape of reflective spherical or aspherical surface areas. For this purpose, an illuminated, diffuse scattering pattern is arranged opposed to the surface area to be measured, wherein the image of the pattern generated through the reflecting surface area is recorded by an electronic camera. The pattern is selected such that onto the image sensor of the camera, an image of approximately straight and equidistant strips is generated, which can be evaluated by means of a discrete Fourier transformation with a particularly high accuracy. In order to be able to measure the surface in any space direction, the strip system being generated onto the image sensor has to have strips arranged orthogonally to each other.

From DE 103 45 586 A1, a method and a device for determining the structure of a surface are known, in which a plane pattern is generated by an image generator and reflected at the surface. The reflected pattern is imaged by an image recorder and subsequently evaluated by a control. In order to achieve a simple, inexpensive and fast areal measuring of the surface of the object, a plurality of areal patterns with areal structures are successively generated pixel by pixel by the image generator, wherein the structures of two patterns have different dimensions, and the individual pixels of two patterns each have a defined position. Since with this method, fine strips of a strip pattern are not recordable anymore, relatively wide strips are used for the strip pattern, which have a sinus-shaped brightness behavior. These patterns are generated on TFT monitors.

DE 101 27 304 A1 describes a method and a device for determination of a three-dimensional contour of a reflective surface of an object, in which a reflection of a known grid on the surface of the object is imaged on a receiver by means of an imaging system, and the image being generated is evaluated. For this purpose, it is proposed to use a known grid of at least two different distances from the reflective surface, wherein the relative position of the grids and the receiver to each other in the space must be known.

In all these approaches, it is assumed that the position and orientation of the measuring system have been determined beforehand by a suitable calibration method and hence are known. This can be realized for small surfaces to be measured. However, if larger areas are to be measured with sufficient accuracy and the speed that is required in modern production processes, it is normally necessary to use a plurality of cameras, which preferably should be located within the pattern. In order to measure large surfaces, the pattern reflecting in the reflective surface must have a sufficient size. Since the pattern also has to be changeable, the pattern is often projected onto a screen in the form of an image. For this, however, for large surface areas, a lot of space is necessary, which often is not available. Further, for generation of the pattern, flat screens are used, wherein for generation of patterns with a large area, often a plurality of screens are used, which have to be calibrated by means of a complex calibration method for each individual camera which is used. When using a plurality of screens and cameras, further, a method needs to be found, how the transition from one camera to the next or the next screen, respectively, can be realized.

With use of one pattern only in a certain distance from the surface, and only one camera, the shape of the reflective surface can not be finally determined either with the conventional methods, because an ambiguity between the surface angle and the surface distance or the surface height, respectively, arises, which can not be resolved without additional information. This problem is solved by the known methods (cf. e.g. DE 101 27 304 A1) in that a plurality of cameras are used, or a plurality of patterns are arranged in a different distance from the surface. This, however, has the disadvantage of a high expenditure of equipment, since each area of the surface to be measured has to be covered by a plurality of patterns and/or cameras.

It is therefore object of the present invention to propose a possibility with which by means of a system with a low expenditure of equipment, a reliable measuring of the shape of reflective surfaces and, in particular, also of transparent objects, is allowed, wherein the calibration of the system and the measuring of the shape are to be particularly easy to handle.

For this purpose, it is proposed according to claim 1 that for measuring the shape from the viewing directions of the camera, which are known pixel by pixel, and the positions of the pattern, which correspond to the mapping of the reflected pattern on the pixels of the camera, the surface angle and the surface height are determined. The reflective surface, within the scope of this invention, is not only a completely reflective surface, but, in particular, also a partially transparent surface, for example of a glass pane. Therefore, the invention is overall particularly suitable for the measurement of windshields for vehicles. By the viewing direction for each pixel of the camera being preferably known, from the location of the pattern area which is reflected on this pixel, the corresponding pattern position can be determined with high spatial resolution and simple optical means so that a fast and accurate measurement of the surface is possible. In addition, the measurement of the surface can still be carried out if the camera is located in the focus of spherical curved surfaces.

The viewing direction of each pixel of the camera can hereby, in particular, be known from a preceding or subsequent calibration of the proposed system for measuring the shape according to the invention, which is also subject matter of the present invention, and can be performed, in particular, in combination with the method for measuring the shape described below.

According to a preferred embodiment of the proposed method, for the analysis of the pattern recorded by the camera, which, for example, has a pattern sequence of at least two distinguishable and periodically occurring pattern elements, a phase-evaluating method, a time-coded method and/or a frequency-coded method is used. This method can be applied either to the calibration which is described later, or to the measuring of the shape, or to both of the methods. Preferably, the pattern sequence can have two different light intensities. It was found that by this method a particularly high spatial resolution can be achieved. Hence, it is particularly suitable to determine the position of the pattern point mapped in the pixel within the pattern. A time- and/or frequency-coded method, for example, can be such that different patterns in a chronological sequence and/or for a different time period are displayed on the pattern carriers and recorded by the cameras. In a subsequent evaluation it can be determined which camera pixel looks onto which pattern area through a substantially combinatorial evaluation, because the type of the pattern is known. The simplest approach would be to individually control each monitor pixel of a pattern carrier formed as a monitor, and to allocate it to the respective camera pixel. By an appropriate pattern selection and a chronological sequence of different patterns, however, this determination can be accelerated and/or refined. Another possibility is due to a phase-evaluating method, in which the pattern has, for example, a certain brightness behavior. By shifting the pattern, an accurate localization of the pattern point can then be carried out by means of a phase analysis. For this, the pattern is at least triple-shifted. A combination of these two methods is also conceivable.

According to a preferred realization of the proposed method, for at least one basis point on the reflecting or reflective surface, respectively, the surface height and/or the surface angle is determined exactly. Based on this, the surface height at a point adjacent to the basis point can subsequently be estimated, and from this, its surface angle can be determined. Since the angle determination for the system dimensions existing in practice, i.e. measuring distances which are not too small, are not very sensitive to height inaccuracies, the surface angle can be determined very accurately in this manner. This surface angle at the basis points, and at the points adjacent to the basis points, can then be integrated to the searched surface shape. Here, as adjacent points not only directly bordering points are be understood but also each of the remote points, which are adjacent to surface points, for which the surface height and/or the surface angle has been already determined or estimated. In principal, it is then possible, based on only one basis point, which, for example, is located in the middle of the surface to be inspected, to determine the entire surface structure or shape, respectively. For improvement of the accuracy, further, principally known methods for curvature correction can be used.

In practice, for this basis point, which serves as the start point, first the surface height will be determined exactly. For this, a defined pattern point can be covered by a marker arranged in front of the pattern to identify the surface point exactly. Assuming a known pattern, subsequently the absolute surface height of the surface point reflecting the marker can be determined, for example, by means of a principally known triangulation method.

For this it is particularly advantageous if the marker is formed by a linear shaped object, which is arranged in front of the pattern, and preferably not perpendicular to the reflective surface. From the known viewing direction of the camera pixel mapping the surface point (known straight line in spatial direction), and the covered pattern point, a plane is defined, and the intersection point of the object with this plane is determined. By means of the intersection point of the object with the plane and the covered pattern point, the straight line extending from the pattern point and running to the surface point on the reflective surface can also be determined. The intersection point of both straight lines then determines the searched surface height with high accuracy. As an object, shapes which are easy to define mathematically, such as straight lines or circles, are particularly suitable. In practice, those can be realized by means of thin sticks or twines spanned in front of the pattern.

Alternatively or additionally, for an exact determination of the surface height, from a known distance between two pattern points in the pattern carrier plane, and assuming a plane mirror, the height of the same can be estimated, and from this, its angle can be determined. Basing on the angle determined in this manner, an improved height determination can then be carried out so that by means of an iterative application of this method, the surface height can be estimated accurately enough, in particular because the sensitivity of the surface angle to distance errors is relatively small, and therefore the estimated angle is comparatively accurate. Since with this determination of the surface height no further equipment elements are necessary (a plurality of cameras and/or pattern, distance markers arranged in front of the pattern or the like), this method is particularly simple to use for the height measurement of a surface point. This method, however, functions well only in the case that the surface is not curved too much, and the distance between the two mirror points is so small that the assumption of the plane mirror of the surface to be measured is not grossly wrong.

Even when it is basically possible to measure the entire shape, starting from a basis point, the accuracy of the measurement of the shape can be increased according to the invention in that a plurality of basis points are laid over the surface to be measured in a preferably dense grid, wherein then, starting from each basis point, the shape of the surface is determined. In this manner, the surface shape is estimated only up to a certain distance around a basis point based on the determined surface height in the basis point, so that errors from the determination of the exact position or height of the basis point, respectively, is not noticeable excessively. Since a whole surface has to be composed of the surface shapes which are determined around the basis point, additional boundary conditions arise, which overall increase the accuracy of the measuring of the shape. In addition, the calculation around each basis point can be carried out in parallel so that the method is performable particularly fast.

For further increase of the accuracy, it is possible according to the invention that the pattern, which in particular can be displayed on monitors, beginning with a coarse pattern, is refined successively, in particular, up to the resolution limit of the monitors. As a pattern, for example, a strip grid can be considered, wherein the strip shape, however, can be selected almost freely and application-specific. Useful pattern shapes can be rectangles, rounded rectangles, trapezoidal or sinusoidal shapes. In order to be able to measure each spatial direction of the pattern, the patterns or strip grids, respectively, are generated in two different, non-parallel spatial directions and reflected by the surface to be measured. Preferred is an orthogonal arrangement of the pattern, i.e. a rotation of the pattern by 90° in the projection.

Further is proposed according to the invention to generate different pattern structures during a measurement, which in particular can be selected depending on the shape to be measured and the fineness of the pattern which is actually applied.

The method according to the invention can be used in particular for transparent objects. A typical exemplary application for this are windshields of vehicles or other curved glasses. Particularly preferred, in this case, the shape of a plurality of reflective surfaces can be measured at the same time, for example the upper and lower side of a glass pane and/or a plurality of glass panes arranged on top of each other, or other transparent objects. It is useful in particular for the measurement of transparent objects, depending on the fineness of the reflected pattern, to adjust the pattern structures such that the pattern structures of the different surfaces can still be resolved. For this purpose, it is possible to change from a strip pattern to a point pattern.

A substantial improvement for the measurement of a plurality of surfaces can be achieved in that in a first step of the method, the surface on top is determined, in particular, only up to an accuracy up to which the multi-reflections do not play a role yet. Alternatively or in addition, if necessary, those areas of the surface can be measured, in which multi-reflections of the different surfaces still can be separated or resolved, respectively. On the basis of this measurement, the shape of the surface is approximately known, and hence it can be calculated how the known pattern displays itself so that in a second step of the method, the multi-reflections can be evaluated. If the shape and the position of the surface to be measured are approximately known, instead of a rough measurement of the shape of the surface in the first step of the method, the known values can also be used. In pendency on the actually present pattern shape, the pattern can in particular be continuously refined and thereby the shape of the surface can be, if necessary, iteratively determined with high accuracy. For this purpose, during the refining of the pattern structure, the type of the pattern can be adjusted accordingly, depending on the (preliminary) determined or known shape of the surface. This is valid also for the case if only one surface is measured, since the appropriate structure of the pattern depends, in particular, also on the shape of the surface.

The invention further relates to a method for calibration of a system which has a pattern carrier with a pattern for reflection at a reflective surface, and a camera for viewing, pixel by pixel, the pattern which is reflected on the surface. For calibration, according to the invention, two large-area, plane mirror surfaces in parallel arrangement are used, the exact distance of which must not be known. A specific advantage of the proposed calibration is that for a calibration, according to the invention, no further information other than the geometry of the pattern and the exact parallel alignment of the two mirror surfaces are used.

The plane suspension of large mirror surfaces has been found to be difficult in practice. In addition, a considerable expenditure of technical equipment is necessary to adjust a mirror surface such that it is ideally aligned in parallel in two different height arrangements.

In order to solve this problem, it is proposed, according to the invention, that the reflective surface is generated by a liquid. In this manner, the system used for measuring the shape can be easily calibrated, wherein according to the invention the steps of calibrating and measuring the shape can be combined with each other, and can be carried out in particular successively. The calibration can take place before as well as after the actual measuring of the shape. Due to the large, ideally plane surface, it is further possible to calibrate all involved components with a high accuracy at the same time.

In order to obtain optical conditions which are approximately comparable, it is proposed according to the invention that the parallel mirror surfaces are arranged in a height comparable to the reflective surface to be measured.

This can be realized particularly simple when the two parallel mirror surfaces are generated by means of two different filling levels of the liquid in a tray, and/or the tray is moved correspondingly. By using, in particular, a sufficiently viscous liquid, two ideally parallel mirror surfaces can be generated which have optimal mirror quality, because the surface in itself has no curvature or unevenness. According to the invention it is further provided that it is examined by measurement if the liquid, after a change of the height, has come to rest. In the simplest case, this can be carried out in that it is examined if in successive recordings, still differences in the same pixel of the camera are found. As soon as this is not the case any more, a stationary or resting liquid level can be assumed.

Moreover, by using the liquid in a sufficiently dimensioned tray, the mirror surface can be formed large enough that all pattern carriers and cameras of the system can be calibrated into a common coordinate system.

As a liquid, glycerin is particularly suitable.

Finally, according to the invention, in claim 20, a system is proposed for measuring the shape of a reflective surface, comprising at least one pattern carrier for generation of a pattern which can be reflected at the reflective surface, at least one camera for viewing, pixel by pixel, the pattern reflected on the surface, and an evaluation unit for evaluation of the camera images and for determination of the shape and/or for calibration. According to the invention it is provided that the system has a device for the arrangement of a large-area, plane mirror surface, wherein the mirror surface is preferably formed by a liquid.

As a device for the arrangement of a plane mirror surface, in particular, a tray is suitable, into which the liquid can be filled. By means of different filling heights in the tray, it is possible to form in a simple manner a plurality of parallel mirror surfaces and to adjust the height of the mirror surfaces approximately to the position of the objects to be measured. Further, in particular, the tray can alternatively also be lifted or lowered.

In a preferred form of the system, a pattern carrier can be a monitor, in particular a TFT monitor, on which different patterns are displayable.

Furthermore, according to the invention a plurality of pattern carriers can be arranged in a quadrangle, wherein preferably in each crossing point of the pattern carriers, one camera is arranged. It is of course also possible to arrange the monitors angular or even perpendicular to each other. The optimal arrangement results, in particular, from the shape of the surface to be measured, the optimal behavior of which is often known so that the arrangement of the monitors can be optimized accordingly.

Further advantages, features and application possibilities arise from the following description of exemplary embodiments and the drawing. Thereby, all described and/or visually illustrated features form on its own, or in any combination, the subject matter of the invention, even independent of their combination in the claims or their relations.

In the figures

FIG. 3 shows the pattern carriers and cameras of a system for measuring the shape of a reflective surface according to a third embodiment;

FIG. 4 shows the optical path for a camera pixel during the calibration of a system according to the invention;

FIG. 5 shows the evaluation of the triangles used at the calibration in the optical path according to FIG. 4;

Figure 1:
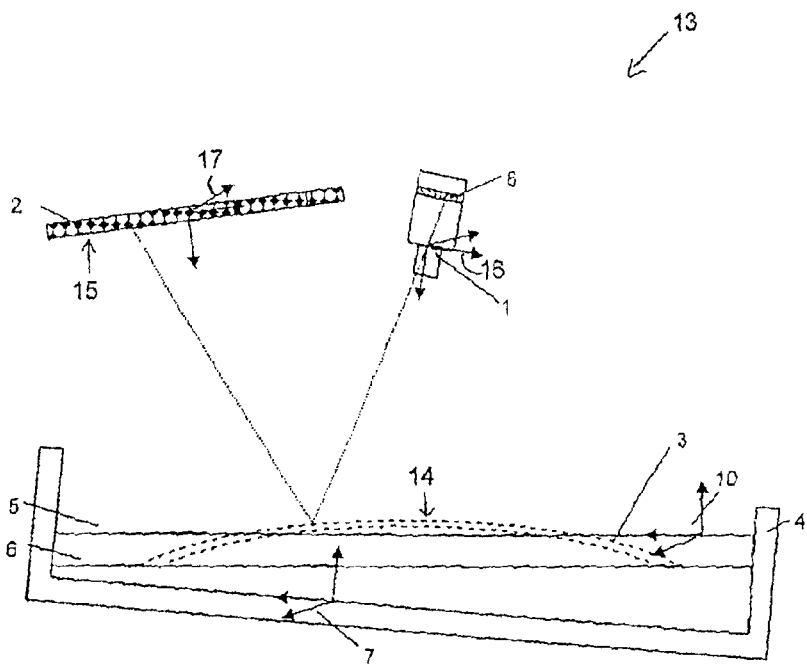
FIG. 1 shows a system according to the invention for measuring the shape of a reflective surface according to a first embodiment.

In FIG. 1, the basic configuration of a system 13 for measuring the shape of a reflective surface 14 of an object 3 to be measured is illustrated. The system 13 has a camera 1 which views the pattern 15 of a pattern carrier 2 via the reflective surface 14. In order to be able to determine the shape of the reflective surface 14 of the object 3, the relation between the camera 1 and the pattern 15 of the pattern carrier 2 must be known. For this, the coordinate system 16 of the camera 1 and the coordinate system 17 of the pattern 15 are determined in a calibration. In addition, the camera 1 as well as the pattern 15 can be calibrated into a stationary world coordinate system 7. This is not necessarily required; however, it improves the clarity of the complete system. Instead of the stationary world coordinate system 7, the coordinate system 16 of the camera 1 or the coordinate system 17 of the pattern 15 can be used as stationary world coordinate system. Thereby the positions and orientations of the camera 1 as well as the pattern 15 in the system 13 are known.

The camera 1 is set up for viewing, pixel by pixel, the pattern 15 which is reflected on the reflective surface 14. In the description of the system 13, the camera 1 is first modeled as a simple pinhole camera for which no internal camera parameters, such as theoretical image distance, distortion, principal point shift or the like, are necessary. However, the same can be used, if they are known, for a faster convergence of the method by modeling the camera 1 as a corrected pinhole camera so that then by means of the known camera parameters, the image 8 recorded by the camera 1 is then converted into a corrected image with known parameters. This image, however, is subsequently treated again in the method as if it has been recorded by a simple pinhole camera.

When a camera views directly inclined on an arbitrary pattern, it is possible, just by evaluation of the image to generate a spatial relation between the plane, known pattern and the camera. Here it is advantageous if a pattern 15 is used for calibration, which is exactly in the same location as the pattern 15, which is later used for measuring the shape, because the exact relation between the pattern 15 and the camera 1 is needed for the evaluation of the measurement of the shape. The form of the pattern 15 can be different. For this purpose, as a pattern carrier, a flat screen monitor, for example, a TFT monitor, is provided, on which any pattern 15 can be displayed. Due to the known pixel dimensions of the flat screen monitor 2, hence the geometry of the displayed pattern 15 is also known exactly. However, other realizations for a pattern carrier 2, for example exchangeable plates with a measured pattern in a holder, are also conceivable.

As can be seen in FIG. 1, the camera, however, can not see the pattern 15 on the pattern carrier 2 if there is no reflective measurement object 3 in the measurement volume. If the camera 1 and the pattern carrier 2 are intended to be calibrated in their arrangement, which is used for the subsequent measuring of the shape, an object with an exactly known shape with reflective properties must be arranged in a position comparable to the measurement object 3. Preferably an exactly plane, reflective surface should be involved because then for the calibration, simple mathematical relations can be used.

Since due to the unknown location of this plane mirror, additional degrees of freedom have to be introduced in the system of equations to be solved, the pattern 15 used for the calibration must be viewed via at least two mirrors in a different location. The simplest solution for this is the arrangement of two exactly parallel mirrors in different heights which are viewed one after the other, wherein the height of the mirrors themselves must not be known. These two mirror surfaces 5, 6 are illustrated in FIG. 1 by solid lines.

In practice, the objects 3 to be measured concern, for example, windshields of vehicles. For such dimensions of objects 3, the manufacturing and arrangement of the large-area mirror surfaces 5, 6 is not quite simple because it is expensive to manufacture mirrors with a sufficient planarity in appropriately large dimensions, and to support them in two different heights without bending. For generation of the two parallel mirror surfaces 5, 6, the lower portion of the assembly 13 is hence formed as tray 4. In this tray 4, a liquid with a sufficient viscosity is poured which has a well reflecting surface. The two heights are realized in that two different amounts of liquid are filled successively into the tray 4. This arrangement has the advantage that the two mirror surfaces 5, 6 are arranged perfectly plane and parallel. In addition, the orientation of these mirror surfaces can be reproduced at any time, which is not necessarily required, but makes the handling of the measuring system easier, for example when replacing a defect camera and for the subsequently required recalibrating. A suitable liquid with sufficient viscosity is glycerin.

Figure 2:
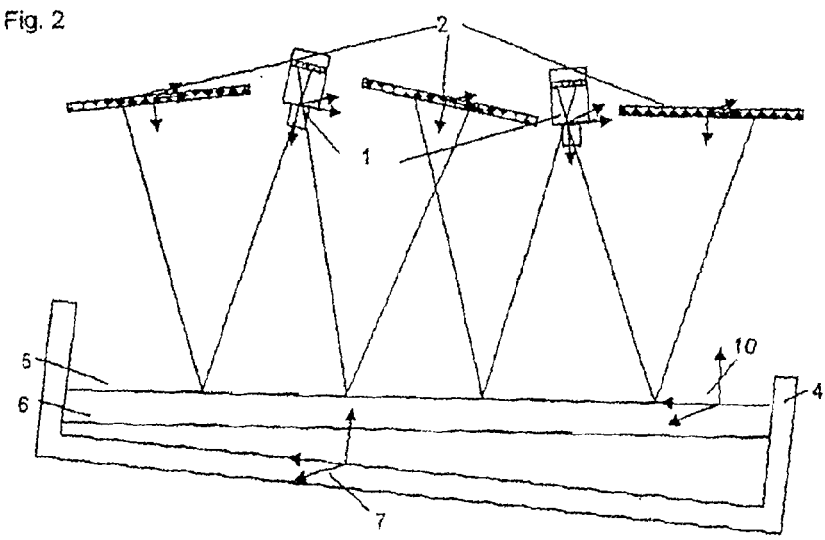
FIG. 2 shows a system according to the invention for measuring the shape of a reflective surface according to a second embodiment.

In FIG. 2, a comparable system 13 is illustrated which, however, has a plurality (three) of pattern carriers 2 and a plurality (two) of cameras 1 which are arranged next to each other, and all together cover a large object area in which the surface of the object can be measured. By providing of the tray 4 filled with glycerin for generation of the mirror surface 5, 6, it is possible to calibrate all patterns 15 of the pattern carrier 2 and all cameras 1 in a simple manner into a common coordinate system 10, since the mirror surfaces 5, 6 of the liquid can be prepared in a simple way and in any size.

In this case, the liquid surface 5, 6 defines preferably the x-y plane of a common coordinate system for all cameras 1 and pattern carriers 2. If in addition, the cameras 1 and the patterns 15 or pattern carrier 2, respectively, are arranged such that each camera 1 views together with at least one other camera 1 a pattern 15 on the same pattern carrier 2, the relation between all components in the rotation about the surface normal of the mirror surface 5, 6 and the displacement against each other on this surface can also be determined. For this, it is not necessarily required that each of the two cameras 1 maps the same pattern area 15 on a pattern carrier 2, because due to the known geometry of the total pattern 15, the relation between two different pattern areas 15 can be established. As zero point of the coordinate system 10, any point on the surface can be selected. The same applies for the zero point of the rotation about the surface normal. In this manner, all components can be calibrated together into a coordinate system 10.

A particularly useful arrangement for a system 13 according to the invention is illustrated in FIG. 3, in which n×m pattern carriers are arranged matrix-like in a quadrangle. In each crossing point of the pattern carriers 2, a camera 1 is located so that each camera 1 views four pattern carriers 2 and—apart from the pattern carriers 2 at the boundary of the matrix—all pattern carriers 2 are viewed by four cameras 1. The corresponding image areas 12 of the cameras 1 are illustrated in dashed lines.

Even if it is not necessary for the measurement of the shape of an object 3 to define a reproducible coordinate system because the shape of the object with respect to the coordinate transformation between different reference coordinate system is, of course, invariant, it is in some cases desirable to establish a relation to fixed predetermined coordinate system. This can, for example, make the handling of the whole measuring system 13 easier.

The orientation of the X-Y plane in the coordinate system 10 is always the same because of the liquid surface. For the other degrees of freedom, markers which are visible for the camera 1 can be attached. This way, for example, a zero point can be defined on a pattern carrier 2, and marked such that it can be recognized by at least one camera 1. By defining a second fix point, the zero point of the rotation about the surface normal can also be defined. When using flat screen monitors as pattern carriers 2, this marking can also be displayed on the monitor.

As a common coordinate system 10, therefore, first the one coordinate system can be used, the X-Y plane of which coincides with the mirror surface 5, 6. Based on this coordinate system 10, a relation to any world coordinate system 7 can then be established, which, for example, is connected with the tray 4.

With reference to FIG. 4, hereinafter the installation of the system 13 is described in detail by means of a pattern 15, which is displayed on a flat screen monitor 2. Here, for each pixel of the camera 1 of the system 13, the pixel of the flat screen monitor 2, which is viewed by the camera 1 or the camera pixel, respectively, is determined. To begin with, this measurement is independent from the calibration, and determines the viewing direction of the camera 1 for each pixel.

For this, the positions $x_k$, $y_k$ and $z_k$ of the camera are established as parameters in the reference coordinate system. The point defined by the coordinates $x_k$, $y_k$ and $z_k$ denotes the point in which all beams, which reach the camera, meet in the lens. Furthermore, as further parameters, the positions of each pixel of the flat screen monitor 2 in the reference coordinate system, and the viewing direction of each pixel of camera 1 including the (measured) lens distortion in the reference coordinate system are determined.

Below the arrangement of the system 13 consisting of cameras 1 and flat screen monitors 2 (TFT monitors), a tray 4 filled with glycerin is placed, which can be attached in different heights. This tray 4 is blackened on the inner side. As soon as the glycerin in the tray 4 comes to rest, an optically perfect and plane reflective surface 5, 6 is reached. Then, for two heights ($h_1$, $h_2$), to each pixel of the camera 1, the corresponding pixel of the flat screen monitor 2, onto which the beam of the corresponding camera pixel was reflected by the mirror 5, 6, is allocated. The dimensions $h_1$ and $h_2$ are the two heights in which the glycerin surface (mirror surface 5, 6) was measured.

The measurement is carried out in that on the flat screen monitor 2, suitable patterns 15 are successively displayed, and their mirror images 8 are recorded by the camera 1. By means of a suitable selection of the patterns 15, each individual monitor pixel can be identified after a certain number of images 8. For this, each pixel can be coded in its brightness sequence (for example as grey code), or a suitable grey value progression, or a sequence of grey value progressions, is used.

Below, an example for a suitable parameterization is given which, however, can be varied without departing from the subject matter of the invention. The point of origin is connected with a pixel (0, 0) of any one of the flat screen monitors 2. Through the selection of the spatial coordinate of this pixel, the position of the coordinate system is determined. The mirror surface 5, 6 of the liquid surface is selected to be parallel to the X-Y plane of the coordinate system 10, so that the Z-direction of the coordinate system 10 stands perpendicular on the mirror surface 5, 6. The X-axis of the coordinate system extends perpendicular to the long side of the flat screen monitor 2, which defines the point of origin.

By means of this selection a unique coordinate system 10 is predetermined, in which all system components can be measured.

The distance between two pixels on a flat screen monitor 2 is exactly known from its production. For a 17" monitor, this distance is, for example, 0.264 mm. If the location of a monitor pixel in the space and the three spatial angles, at which the monitor is arranged in the space, are known, for each monitor pixel, the position in the space can be determined accurately. This metric is exactly the same in all flat screen monitors 2, and therefore ensures that the three-dimensional world coordinates are also metrical.

In FIG. 4, the optical path for a single pixel of a camera 1 is now illustrated. Here, the coordinates $x_k$, $y_k$ and $z_k$ are the positions of the camera, $h_1$ and $h_2$ are the heights of the mirror surfaces 5, 6, and $x_{s1}$, $y_{s1}$ and $z_{s1}$ are the spatial coordinates onto which a camera pixel at reflection in the height $h_1$ is reflected. Here, the triangles which are illustrated in different grey scales in the lower portion of FIG. 4 are similar in the mathematical sense.

According to the illustration in FIG. 5, the two small, and the two large triangles, can each be combined into one triangle, respectively. The height and the width of these two triangles are then known. Due to the similarity of the triangles, the following relation applies:

$$\frac{a}{x_k - x_{S2}} = \frac{b}{x_k - x_{S1}}$$

with $$a = z_k + z_{S1} - 2h_1$$

and $$b = z_k + z_{S2} - 2h_2$$

With this relationship, a parameter can be calculated in the equation. Solved for $x_k$, this equation is:

$$x_k = \frac{a x_{S1} - b x_{S2}}{a - b}$$

The calculation for $y_k$ takes place in an analogue manner by changing the coordinate direction X and Y.

This equation is formed for each pixel of the camera 1. The condition for the solution of the equation system is that all beams of pixels, which belong to a specific camera 1, intersect in one point. The resulting equation system is solved by means of an appropriate optimization algorithm, such as for example Newton-Gauss-Jordan. For simplification of the optimization, it is also possible to use only some selected pixels.

As advantageous initial values for the optimization, appropriate values can be used. Thus, the position of all flat screen monitors 2 can be measured roughly as position of the pixel (0, 0) and used as initial value. The same applies for the three spatial angles of each monitor. Further, the heights $h_1$ and $h_2$ of each camera Z and the mirror surfaces 5, 6 are measured roughly and used as initial value.

For each flat screen monitor 2, then the X, Y and Z coordinate of the pixel (0,0) and the three spatial angles of its location are optimized. The same applies for the heights $h_1$ and $h_2$ of the mirror surfaces 5, 6 and the height of the camera position Z. As a result of the optimization, the correct position and location of each flat screen monitor 2 and each camera 1 is obtained. In addition, for each pixel that has carried out a valid measurement for at least one height, the point is known onto which the camera is looking in the plane z=0. For the reflections in the heights $h_1$ and $h_2$, the following relation arises $$x_{z=0} = x_k - \frac{z_k(x_k - x_{S1})}{z_k + z_{S1} - 2h_1}$$

and $$x_{z=0} = x_k - \frac{z_k(x_k - x_{S2})}{z_k + z_{S2} - 2h_2}$$

These equations arise from the consideration of the triangles according to FIG. 5.

Since this calculation is carried out separately for each camera pixel after the calibration, the viewing direction in the space is known for each pixel of the camera 1, including the lens distortion, because the same was also considered or measured, respectively, at the image recording. Instead of the modeling of the camera with distortion models, with this approach, thus, a viewing direction is explicitly determined for each pixel.

Basically, a distortion model could also be modeled at the same time. Hereby the equation system to be optimized is changing such that these parameters appear additionally, and are being optimized which results in a higher amount of calculation work.

Further, for each mirror height, a principally known calibration could be carried out for a plane pattern without considering the fact that the camera 1 actually looks at a mirror of the pattern 15. Then, for each mirror height $h_1$ and $h_2$, a different, virtual camera position arises. Since it is known, however, that it is actually always the same camera position, and only the mirror heights (with exactly parallel mirror surfaces 5, 6) were different, an equation system can be formed which uses this boundary condition. By means of optimizing the equation system, the correct position of the camera 1 is obtained.

This method has the advantage that the calibration can be split into two steps, and that for the first step, known standard methods can be used. It has, however, the disadvantage that for the first step only the pattern 15 on a pattern carrier 2 can be utilized. In an arrangement with a plurality of cameras 1, in practice, one pattern carrier 2 covers only a portion of the image field and only one-sided, i.e. only on one side of the image field. A good calibration, however, can be carried out only if the image field is somewhat regularly covered with pattern points.

As soon as the calibration of the system 13 has been carried out as specified, the measuring of the shape of the reflective surface 14 of the object 3 can be performed. For this, different flat screen monitors 2 are switched on with different brightnesses, one after the other or at the same time, in order to recognize at which flat screen monitor 2 the camera 1 is looking. Then a coarse strip grid is generated on the flat screen monitor 2 to further narrow down the position in the pattern 15 where the camera 1 is looking. The strip pattern 15 is refined to the resolution limit of each of the flat screen monitors 2 and mapped onto the pixels of the camera 1, respectively.

In order to be able to measure the reflective surface 14 in all directions, the strip pattern 15 is also rotated by 90° and displayed on the flat screen monitors 2, and the specified refining of the pattern 15 is carried out also in this direction. Since in the described configuration basically not all areas of the reflective surface 14 are covered by two patterns 15 and/or two cameras 1, an ambiguity in the surface angle and/or surface distance arises.

To solve this ambiguity, at least one starting point or basis point, respectively, is needed, in which one of the two dimensions (surface angle or surface height) is known. At this point, height and angle then can be determined precisely. Based on this basis point, subsequently the height in the adjacent points is estimated, and the angle is determined. For system dimensions which are available in practice and which have measuring distances which are not too small, the angle determination is not very sensitive to height inaccuracies. Therefore, in this manner, the surface angle in a surface point can be determined very accurately. The surface angle in the surface points can then be integrated to the total shape. For this, for accuracy improvement, principally known methods for curvature correction can also be used.

Since at determination of a starting point or basis point, respectively, it is normally easier to specify a height, for resolving of the ambiguity of surface angle and surface height, the following methods can be used:

If the complete system 13 is measured in the coordinate system, the supporting height of the measurement object is known. However, the supporting points of the measurement object can always be only a few points so that the integration intervals are wide. When using the supporting points as basis points, hence the result is very sensitive to small measuring errors.

In the overlapping area of two cameras, a dual-camera method can also be used, in which the height of a point is determined by monitoring with two cameras, the position and orientation of which are known. However, this is in practice difficult, since in case of curved surfaces, often one camera only sees one reflected pattern. To capture the entire surface each time with at least two cameras, respectively, a lot of cameras and/or pattern would have to be provided.

Reflective surfaces, such as windshields, have partially areas which are hardly or not at all reflective. These are, in particular, the edges or, for example, areas which are not reflective because of overprints thereon. Those can be measured with known methods for non-reflective surfaces, such as strip triangulation or stereo measuring methods. This method, however, functions only if non-reflective areas are present. In addition, in this case, the integration intervals become very wide, which results in high dependency on small measuring errors.

Therefore, according to the invention, the following methods are preferably used for height measurement of the basis points.

Figure 6:
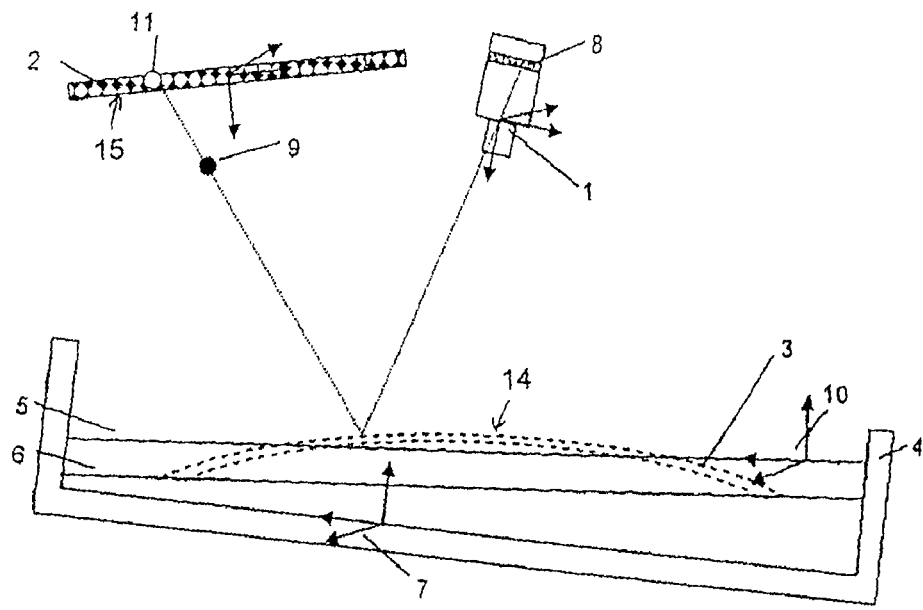
FIG. 6 shows the system according to the invention according to FIG. 1 during the measuring of the shape and FIG. 7 shows an alternative form of the system according to the invention according to FIG. 1 during the measuring of the shape.

According to a first possibility, in a certain distance in front of the actual pattern 15, small markers 9 are attached in a given grid of basis points. Those can be arranged on small sticks or on a pane arranged in front. The position of a marker 9 is exemplary illustrated in FIG. 6. The marker 9 hides a small area 11 of the pattern 15 from the camera 1. By recognizing the surrounding points of the pattern 15, it is possible to determine exactly which point 11 of the pattern 15 is covered by the marker 9. Hence, the absolute height of the surface 14 at this point can be determined, for example, with a triangulation method.

The position of the markers 9 can be determined at the calibration with the proposed liquid surface as mirror surface 5, 6 in a preceding or subsequent step.

Figure 7:
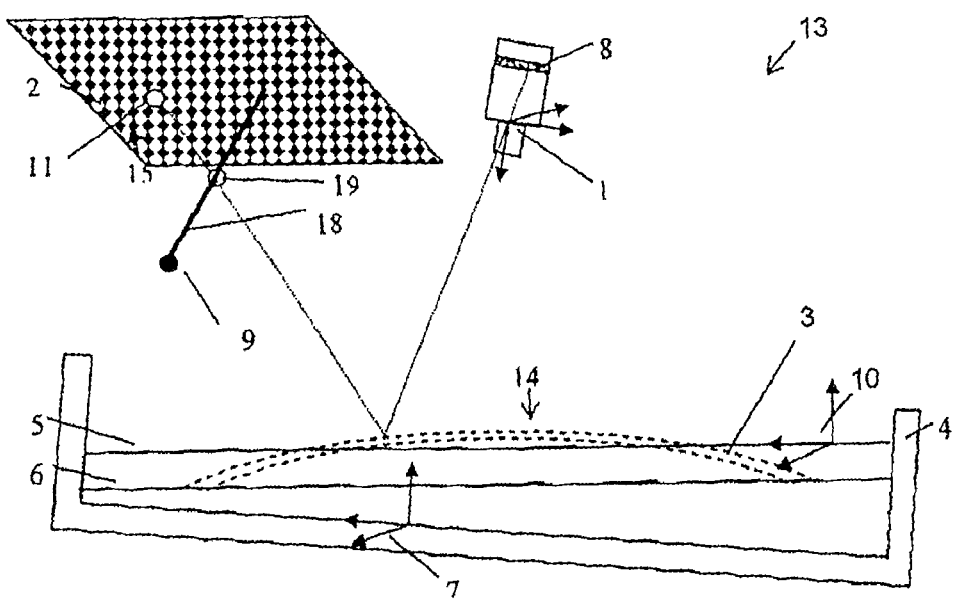

In FIG. 7, a refining of the proposed method is illustrated, which is explained hereinafter. In a comparable manner to marker 9, a thin object 18 with a known shape, which preferably is easy to define mathematically (for example a stick, twine or circle), is attached in a certain distance in front of the pattern. The object 18 can also be a semi-transparent pattern on a pane arranged in front.

This object 18 is then mapped in the camera 1 or on its pixels 8, respectively. Since the object 18 is thin or semi-transparent, the covered area 11 of the pattern 15 can be determined. Through the pixel or the camera pixel 8, respectively, and the mapping center of the camera, the viewing direction of the camera pixel is defined, which forms a straight line extending from the pixel 8. This straight line is illustrated as a dotted line in FIG. 7. By means of this straight line and the known covered pattern point 11, a plane is defined. When the location of the object 18 in the space (for example from a calibration) is known, the intersection point 19 of the object 18 with this plane can be determined. The only condition for this is that the object 18 is not located completely in this plane. This can be achieved, for example, by means of different objects 18 with different orientations.

The covered pattern point 11 and the intersection point 19 define a further straight line which is also illustrated as a dotted line. The intersection point of the two straight lines is the searched surface point at which, then, the surface point and thereof the angle for the integration can be determined with high accuracy.

The location of the object 18 can be determined at the calibration of the system, either by an external measurement or preferably by a second calibration step. In this second step, after calibration of the camera 1 and the pattern carrier 2, the location of the object 18 is determined as long as the plane mirror surface 5, 6 is still available. This is possible because at this point of time, the shape or the arrangement of the mirror 5, 6, respectively, is known.

Another method arises by the second possibility for the height determination described below, which in practice, has proven to be sufficiently accurate. Here, on the assumption of a plane mirror, the height of the reflective surface 14 of the object 3 is approximately determined by estimating the height of the mirror. Thereof, the associated angle can be determined. Since the sensitivity of the angle to distance errors is relatively low, this angle is substantially more accurate than the estimation of the height of the mirror. As soon as the angle is known, the height can be determined thereof again with increased accuracy. Thereof, the height of the reflective surface 14 in the basis point or the basis points, respectively, can be determined iteratively. This approach can be usefully implemented if the reflective surface 14 is not curved too much, and the distance of the two viewed mirror points of the pattern 15 is so small that the assumption of the plane mirror is justified.

Hereby, in a simple manner, any grid of basis points can be specified on the reflective surface, the shape of which is to be measured.

With the above described method, it is further possible to measure a reflective surface 14 even then, when reflections of a plurality of reflective surfaces are present, for example, if reflections of a second (lower) glass surface or a plurality of panes arranged one below the other are also to be measured. This results often in difficulties, because the multi-reflections can not be separated properly from each other any more, and an analysis of the shape of one of the reflective surfaces 14 can not be performed reliably any more.

To prevent problems due to multi-reflections without, for example, coating the rear glass surface with a reflective material, it is proposed to provide in a first step, according to the above described method, a rough shape determination of the reflective surface 14.

The resolution refinement of the used patterns 15 is then to be discontinued when the used patterns 15 are not resolvable any more due to the multi-reflections. Then, the shape can normally already be determined so accurate that, except for a few areas, if applicable, it can already be calculated how a known pattern will be display itself in a multi-reflection. On the basis of this calculation method, the shape of the surface of the reflective surface can then also be determined accurately based on higher resolving patterns 15.

In practice, three areas are to be distinguished here. In a first area, up to a certain angle, the reflections of the different surfaces overlap so much that they are not separable any more. In this area, in principal, only the highest reflective surface can be measured, whereby the multi-reflections do not disturb.

Beginning with a certain angle, the reflections can be separated but are still partially overlapping. Since the shape of the pattern is known, the reflections on the different surfaces can be separated mathematically and by evaluation of the different brightnesses, which are depending on the overlap. Thus, every surface can be measured.

Beginning with a certain angle, the reflections resulting from the multi-reflections are separating completely, so that a very accurate measurement of these surface shapes is possible also for surfaces arranged further down. As a pattern, in particular, a point pattern is suitable.

For measuring the different surfaces, different patterns 15 can be used here, which are adapted to the reflection conditions of the different areas of the pane.

With the proposed method and the proposed system it is hence possible to reliably measure the upper reflective surface of a transparent object. In wide areas, surfaces located below can also be measured without a particularly high expenditure of equipment being necessary.

REFERENCE LIST

1 Camera
2 Pattern carrier
3 Object
4 Tray
5 Mirror surface for calibration
6 Mirror surface for calibration
7 World coordinate system
8 Image, camera pixel
9 Marker
10 Common coordinate system
11 Covered area
12 Image field of a camera
13 System
14 Reflecting/reflective surface
15 Pattern
16 Coordinate system of the camera
17 Coordinate system of the pattern
18 Object
19 Intersection point

The invention claimed is:

1. A method for measuring the shape of a reflective surface (14) with a system which comprises at least one pattern (15) for reflection at the reflective surface (14) and at least one camera (1) for viewing, pixel by pixel, the pattern (15) which is reflected at the surface (14), wherein the position and the orientation of the camera (1) and of the pattern (15) are known, characterized in that from the viewing directions of the camera (1), which are known for the pixels (8), and the positions of the pattern (15), which correspond to the mapping of the reflected pattern (15) on the pixels (8) of the camera (1), the surface angle and the surface height are determined for the purpose of measuring of the shape;

characterized in that for the accurate determination of the surface height, a defined pattern point is covered by a marker, which is arranged in front of the pattern to identify exactly the surface point, and the absolute surface height of the surface point which reflects the marker is determined.

2. The method according to claim 1, characterized in that for each pixel (8) of the camera (1) the viewing direction is known.

3. The method according to claim 1, characterized in that for the analysis of the pattern (15) recorded by the camera (1), a phase-evaluating method, a time-coded method and/or a frequency-coded method is used.

4. The method according to claim 1, characterized in that for a basis point on the reflective surface (14), the surface height and/or the surface angle is determined accurately, wherein based thereon, the surface height in a surface point adjacent to a basis point is estimated, and thereof the surface angle is determined.

5. The method according to claim 1, characterized in that the marker (9) is built by an object (18), which is arranged in front of the pattern (15), that from the known viewing direction of the pixel (8), which maps the surface point, and the covered pattern point (11), a plane is determined, and the intersection point (19) of the object (18) is determined with this plane.

6. The method according to claim 1, characterized in that the marker (9) or the object (18), respectively, is of circular or line-type shape.

7. The method according to claim 1, characterized in that for the accurate determination of the surface height from a known distance of two pattern points, and assuming a plane mirror, the height of the same can be estimated, and thereof its angle is determined.

8. The method according to claim 1, characterized in that a plurality of basis points are placed over the surface (14) to be measured in a grid.

9. The method according to claim 1, characterized in that the pattern (15), beginning with a coarse pattern (15) is refined successively.

10. The method according to claim 1, characterized in that different patterns are formed.

11. The method according to claim 1, characterized in that the measurement is carried out at transparent objects.

12. The method according to claim 11, characterized in that in a first step of the method, the upper surface and/or the areas of the surface, in which the multi-reflections of the different surfaces can be separated, are measured, and/or a previously known shape and position of the surface is used, and it is calculated how the known pattern displays itself in multi-reflections, and that in a second step of the method the multi-reflections are evaluated.

13. The method according to claim 1, characterized in that the shape of the pattern (15) depends on the resolution.

14. A method for calibrating a system which comprise a pattern carrier (2) with a pattern (15) for reflection at a reflective surface (14), and a camera (1) for viewing, pixel by pixel, the pattern (15) which is reflected on the surface (14), characterized in that when calibrating two large-area, plane mirror surfaces (5, 6) are used in a parallel arrangement, and/or that the reflective surface (5, 6) is generated by means of a liquid.

15. The method according to claim 14, characterized in that the mirror surfaces (5, 6) are arranged in a comparable height to the reflective surfaces (14) to be measured.

16. The method according to claim 14, characterized in that the mirror surfaces (5, 6) are generated by two different filling levels of the liquid in a tray (4) and/or a moving the tray (4).

17. The method according to claim 14, characterized in that all pattern carriers (2) and came as (1) are calibrated into a common coordinate system (10).

18. The method according to claim 14, characterized in that the liquid is glycerin.

19. A system for measuring the shape of a reflective surface (14) which comprises at least one pattern carrier (2) for generation of a pattern (15), which can be reflected on the reflective surface (14), at least one camera (1) for viewing, pixel by pixel, the pattern (15) which is reflected on the surface (14), and an evaluation unit for evaluation of the camera images (8) for shape determination and/or calibration, characterized in that the system comprises a device (4) for arrangement of a large-area, plane mirror surface (5, 6), wherein the mirror surface is preferably formed by a liquid;

characterized in that for the accurate determination of the surface height, a defined pattern point is covered by a marker, which is arranged in front of the pattern to identify exactly the surface point, and the absolute surface height of the surface point which reflects the marker is determined.

20. The system according to claim 19, characterized in that the device for arrangement of the plane mirror surface (5, 6) is a tray (4).

21. The system according to claim 19, characterized in that a pattern carrier (2) is a monitor.

22. The system according to claim 19, characterized in that a plurality of pattern carriers (2) is arranged in a quadrangle, and cameras (1) are arranged in intersection points of the pattern carriers (2).

23. The system according to claim 19, characterized in that the pattern carriers (2) are arranged such that they cover the spatial angles which are resulting from the reflective surface (14).

* * * * *